(12) United States Patent
Krohne et al.

(10) Patent No.: US 10,710,232 B2
(45) Date of Patent: Jul. 14, 2020

(54) WEARABLE MANUFACTURING ASSISTANCE DEVICE

(71) Applicant: Airbus Operations GmbH, Hamburg (DE)

(72) Inventors: Ingo Krohne, Hamburg (DE); Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 335 days.

(21) Appl. No.: 15/266,737

(22) Filed: Sep. 15, 2016

(65) Prior Publication Data

US 2017/0072555 A1    Mar. 16, 2017

(30) Foreign Application Priority Data

Sep. 15, 2015   (EP) ..................... 15185353

(51) Int. Cl.
*B25H 1/00* (2006.01)
*F16M 13/04* (2006.01)
(Continued)

(52) U.S. Cl.
CPC ........... *B25H 1/0028* (2013.01); *F16M 13/04* (2013.01); *A45F 2003/146* (2013.01);
(Continued)

(58) Field of Classification Search
CPC ............ A45F 2003/146; B25H 1/0028; F16M 13/04; F16M 11/2014; F16M 13/00
(Continued)

(56) References Cited

U.S. PATENT DOCUMENTS 2,676,207 A * 4/1954 Hunt ..................... F16M 13/04
                                                      224/262
3,140,800 A * 7/1964 Henderson .............. A01C 7/02
                                                       111/76
(Continued)

FOREIGN PATENT DOCUMENTS

| GB | 2501744 | 11/2013 |
| WO | 97/14540 | 4/1997 |
| WO | 2011/156295 | 12/2011 |

OTHER PUBLICATIONS

European Search Report cited in EP 15185353.8 dated Mar. 9, 2016, seven pages.
(Continued)

*Primary Examiner* — Tan Le
(74) *Attorney, Agent, or Firm* — Nixon & Vanderhye P.C.

(57) ABSTRACT

A wearable manufacturing assistance device (1) for supporting a manufacturing tool (3), the manufacturing assistance device (1) includes a body unit (7) including a fastener (11) for fastening the body unit (7) to the back (13) of a technician (5) in a wearing position (15), and an arm member (9) which has an attachment end (19) attached to the body unit (7) and a tool end (21) opposite to the attachment end (19), wherein at the tool end (21) a mounting device (23) for mounting the manufacturing tool (3) to the arm member (9) is provided. While the wearable manufacturing assistance device (1) is fastened to the back (13) of the technician (5) and is in a wearing position (15), the arm member (9) extends from the attachment end (19) at the body unit (7) over a shoulder (17) and laterally past a head (27) of the technician (5).

22 Claims, 4 Drawing Sheets

(51) Int. Cl.
*G02B 7/00* (2006.01)
*G03B 17/56* (2006.01)
*F16M 11/20* (2006.01)
*A45F 3/14* (2006.01)
*B25D 17/28* (2006.01)

(52) U.S. Cl.
CPC .......... *B25D 17/28* (2013.01); *F16M 11/2014* (2013.01); *G02B 7/00* (2013.01)

(58) Field of Classification Search
USPC .... 248/281.11, 289.11, 291.11, 295.11, 317; 224/185, 262, 908, 930, 257
See application file for complete search history.

(56) References Cited

U.S. PATENT DOCUMENTS

| | | | |
|---|---|---|---|
| 3,900,140 A | 8/1975 | Kelso et al. | |
| 4,037,763 A * | 7/1977 | Turchen | F16M 13/04 224/153 |
| 4,206,983 A * | 6/1980 | Nettman | A45F 3/10 224/201 |
| 4,644,654 A * | 2/1987 | Howe | A01G 3/0417 224/262 |
| 6,481,108 B1 * | 11/2002 | Helinski | B25H 1/0028 224/262 |
| 9,513,536 B2 * | 12/2016 | Hellsten | F16M 11/046 |
| 2005/0023015 A1 | 2/2005 | Argento | |
| 2010/0006611 A1 | 1/2010 | Knowles | |

OTHER PUBLICATIONS

Japanese Office Action cited in 2016-179482 dated Aug. 20, 2018, seven pages.

Chinese Office Action cited in Application No. 201610821313.2 dated Dec. 3, 2018, 13 pages.

* cited by examiner

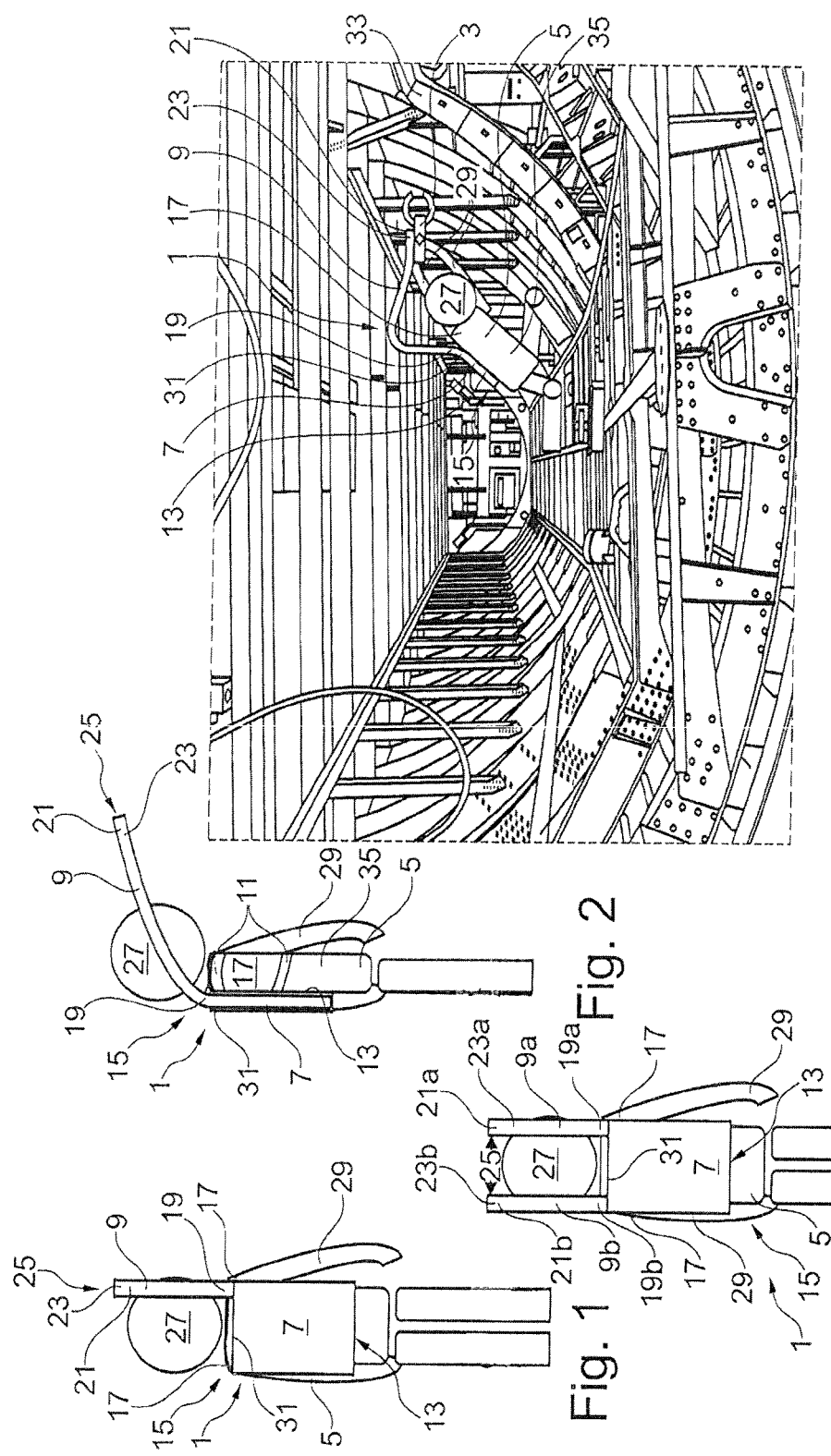

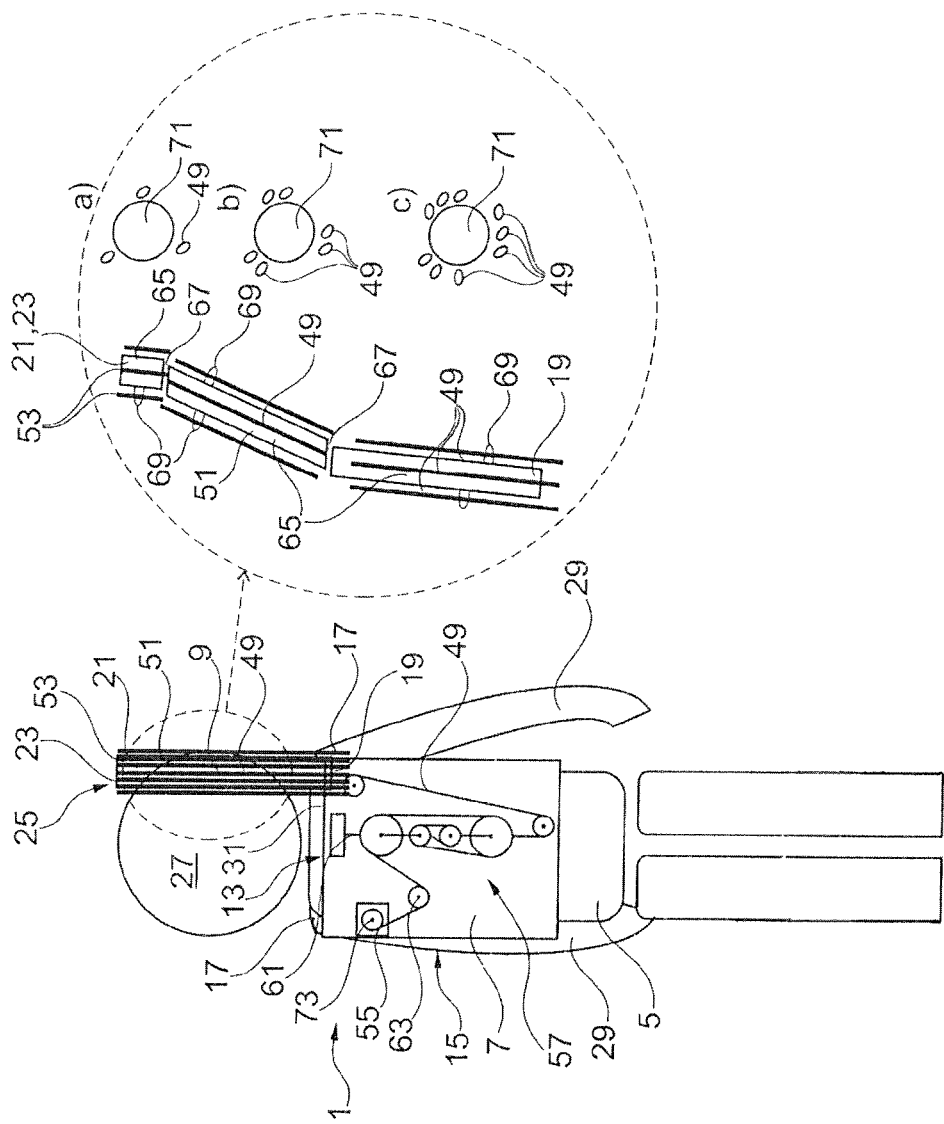

WEARABLE MANUFACTURING ASSISTANCE DEVICE

CROSS RELATED APPLICATION

The present application claims priority to European Patent Application Number 15185353.8 filed Sep. 15, 2015, the disclosure of which is entirely incorporated by reference.

BACKGROUND

The present invention relates to a wearable manufacturing assistance device for supporting a manufacturing tool, in particular for supporting a technician in holding a manufacturing tool during manufacture of an aircraft or spacecraft.

The manufacturing assistance device comprises a body unit and an arm member. The body unit includes fastening means for fastening the body unit to the back of a technician in a normal, intended wearing position. The arm member has an elongate form and may be circular, elliptic, or polygonal cross section with a constant diameter along its length. However, the diameter may also change along its length, either continuously or gradually, so that various sections with different diameters are provided. The arm member has an attachment end attached to the body unit, and a tool end opposite to the attachment end. At the tool end the arm member comprises a mounting device for mounting a manufacturing tool to the arm member.

Similar manufacturing assistance devices for supporting heavy manufacturing tools during manufacture of various technical devices are known in the art. For example, third arm devices or zero-g arm devices are known comprising an arm member for holding a manufacturing tool, such as a drill, in order to support a technician in holding the tool, especially when the tool has a considerable weight and has to be held by the technician over a longer period of time. The arm member can be mounted either to the technical device which is manufactured itself, or to a separate support stand.

Alternatively, the arm member might also be mounted to a body unit which is fastened to the body of a technician, so that the technician can carry the arm member with him and is flexible with respect to his position along the technical device to be manufactured. Such third arm devices or zero-g arm devices which are fastened to the body of a technician are often combined with exoskeletons further supporting the technician in moving his body under the load of the manufacturing tool and the third arm device or zero-g arm device.

However, for the manufacture of some specific technical devices, such as aircraft or spacecraft, where a technician has to perform a lot of overhead work and work in narrow spaces where he has to work on his knees or in a bent position, the known manufacturing assistance devices are less practical, since they require a considerable amount of equipment fastened around the torso of the technician, and the arm is mounted to the hip or the chest of the technician and extends from there upwards in front of his body, which is both bulky and disadvantageous for overhead work and work in narrow spaces, in particular when impact between the manufacturing tool or the manufacturing assistance device and structural parts of the aircraft or spacecraft have to be avoided in order not to cause damage on the structural parts.

SUMMARY

The invention conceived by the inventors and disclosed herein may be embodied to provide a wearable manufacturing assistance device which has a simply and slender construction and which is practical specifically for the work overhead and in narrow spaces.

The invention may include a wearable body unit configured to be fastened to the back of a technician in a wearing position and an arm member that is in a neutral position while in an undeformed, relaxed state. The arm member may extend from the attachment end at the body unit over the shoulder and laterally past the head of the technician, so that the tool end is preferably in the view field of the technician without turning or tilting his head, i.e., when looking straight ahead, and within the radius of at least one of his arms.

The body unit may have a top edge which points to the top, i.e., in a vertical direction of the body of a technician above his head, when the body unit is fastened to the back of a technician in the wearing position, and the arm member extends beyond this top edge or is attached to the body unit at this top edge, such as in a decentral position so that the arm member can proceed over the right or left shoulder of a technician.

In such a way, a manufacturing tool can be supported via the body unit which is fastened at the back of the technician and the arm member which extends from the back of the technician over his shoulder to a position in his view field where he holds the manufacturing tool. No bulky parts of the manufacturing assistance device extend in front of the torso of the technician or along its lateral sides, so that the technician can easily bend over or work on his knees without being handicapped by the manufacturing assistance device. Further, performing overhead work with the manufacturing tool is simplified, because the arm member already holds the manufacturing tool in a position in front of this head or even higher than his head. Further, a very simple construction of the manufacturing assistance device is possible, since the position and course of the arm member does not even require a distinct hinge between the tool end and the attachment end in order to work the manufacturing tool.

According to an embodiment of the invention, the arm member comprises a flexibility that allows it to elastically bend in such a way that the tool end is movable out of a neutral position where the arm member is undeformed or relaxed, within a radius of between 10 and 50 cm, between 20 and 40 cm, or about 30 cm, without the body unit being moved. In particular, the arm member has a length measured from the top edge of the body unit to the tool end of between 50 and 100 cm, between 65 and 85 cm or about 75 cm, a diameter of between 1 and 10 cm, between 2 and 5 cm, and about 3 cm, and a material with a Young's modulus at or below 5 $kN/mm^2$, below 1 $kN/mm^2$, below 0.5 $kN/mm^2$, below 0.1 $kN/mm^2$, or below 0.05 $kN/mm^2$. In such a way, the manufacturing tool mounted to the mounting device at the tool end of the arm member can be moved against the elasticity of the arm member within a radius required during manufacture. At the same time, the stiffness of the arm member is high enough so that the technician might take away his hands from the manufacturing tool and the manufacturing tool is still held in the area of his view field by the arm member, even when it is bent under the weight of the manufacturing tool.

According to another embodiment of the invention, the material of the arm member is softer, i.e., has a lower hardness, than aluminum, in particular than typical aluminum alloys used for aircraft structures, such as 7075 aluminum alloys. The material of the arm member may be softer than common matrix materials of CFRP and GFRP structures, such as polymer resin. Further, the material of the arm member may be softer than common plastic material used for the attachment of cables and pipes in a fuselage, such as polyether ether ketone (PEEK) material. The material of the arm member may be softer than typical plastic materials used for the insulation of cables. In particular, the Shore hardness of the material of the arm member is between 70 and 90, between 75 and 85, or about 81. In such a way, the arm member is configured to not damage structural parts made of aluminum or fiber composite material in, e.g., an aircraft or spacecraft, when the arm member accidently contacts these structural parts.

In another embodiment of the invention, the arm member is formed in one piece. That means, the arm member is formed integrally, forms a single piece component and is not comprised of multiple separate portions which might be connected to one another, e.g., via a hinge. By the one-piece form, the arm member has a simple construction and does not need to be expensive, and the elasticity of the arm member is provided by the material itself.

According to yet another embodiment of the invention, the arm member has a homogeneous stiffness along its length, and may have a constant diameter. In such a way a simple construction of the arm member is obtained, and under load a predetermined uniform deflection of the arm member along its length from the attachment end to the tool end can be provided.

In yet a further embodiment of the invention, the arm member is formed of a single material. The single material within the meaning of the present invention also includes a composite material, in particular a fiber composite material. In such a way a possibly simple construction of the arm member is provided and reliable uniform material properties, such as elasticity, are provided.

In an alternative embodiment of the invention, the arm member is formed of multiple components, wherein the components are formed of different materials. In such a way, the elasticity of the arm member can be adapted to the specific requirements.

In particular, the components may be detachably connected. In such a way, a modular construction of the arm member is provided, wherein the elasticity of an arm member can be adapted to changing requirements by a respective combination of components with the required stiffness.

According to a further embodiment of the invention, the material of the arm member is chosen from a foam, in particular polyethylene foam, such as PE PF663 of Polyform Kunststofftechnik GmbH & Co. KG, D-31737 Rinteln/Germany, from a CFRP, from a GFRP, or from wood, such as bamboo. These materials can provide the required elastic properties. Further, a foam material has a soft surface so that it cannot cause any damage on the aircraft or spacecraft to be manufactured. The body unit may be formed of the same material as the arm member, so that a very simple construction of the manufacturing assistance device is obtained.

In yet a further embodiment of the invention, the arm member is a first arm member, its attachment end is a first attachment end, its tool end is a first tool end, and its mounting device is a first mounting device. The manufacturing assistance device comprises a second arm member, which may be constructed similar to the first arm member, and which has a second attachment end attached to the body unit and a second tool end opposite to the second attachment end. At the second tool end a second mounting device for mounting a manufacturing tool to the second arm member is provided. When the body unit is fastened to the back of a technician in the wearing position, the second arm member extends from the second attachment end at the body unit over the shoulder and laterally past the head of the technician, so that the tool end is in the view field of the technician without turning or tilting his head. The shoulder over which the second arm member extends lies opposite to the shoulder over which the first arm member extends. Both first and second mounting devices may be connected to the same manufacturing tool or to two separate manufacturing tools. In such a way either one heavy manufacturing tool can be supported by two arm members, or two separate manufacturing tools can be supported at the same time in front of the head of the technician, which might be advantageous when two different manufacturing tools have to be used in an alternating manner.

According to a further embodiment of the invention, an adjustment string is provided which is connected to a first string connector provided at the body unit and to a second string connector provided at the arm member, such as in a way that it forms a triangle together with the body unit and the arm member. The length of the adjustment string measured between the first string connector and the second string connector, is adjustable, so that the angular position of the arm member relative to the body unit is adjustable, against the restoring force of the flexible arm member. The adjustment string may be made of a flexible material, in particular a bendable material including plastics. The length of the adjustment string between first and second string connectors is adjustable, e.g., by a ratchet mechanism at the first and/or second string connector, or by a ratchet mechanism between two ends of the adjustment string when the adjustment string is doubled, i.e., passed bidirectional. By adjusting the angular position of the arm member relative to the body unit with the adjustment string the position of the manufacturing tool can be adapted to the needs of a specific technician, even with his hands off the tool.

In a further embodiment of the invention, the body unit is formed as a backpack, wherein the fastening means are formed as belts configured to be passed around the arms and shoulders and/or the hip and/or the legs of a technician. In this connection, the wearing position is defined such that the top edge of the body unit points to the top when the belts proceed around the shoulders, hip or legs of a technician in a normal, intended position. As an alternative to the belts, the body unit may also be integrated in a jacket in order to fasten the body unit to the back of a technician, so that the jacket forms the fastening means. By such belts or jacket the body unit can be fastened to the back of a technician in a fixed a reliable wearing position.

In yet a further embodiment of the invention, the arm member is removably attached to the body unit. In such a way, a modular configuration of the manufacturing assistance device is obtained, wherein a plurality of arm members having different geometries and stiffness can be mounted to the body unit, depending on the actual requirements of the different situations. For example, the attachment end of the arm member can be attached to the body unit by a screw connection, where a screw extends through aligned bores in the attachment end and in the body unit, by a clamp connection, where the attachment end is clamped between clamp jaws of the body unit, or by a snap connection, where a snap latch on the attachment end engages a respective recess in the body unit.

According to yet a further embodiment of the invention, the arm member is supported by a rope which is guided along the upper side of the arm member for movement along the arm member in its length direction. The first end of the rope is connected, i.e., fixedly mounted, to the arm member near the tool end, and the second end of the rope is connected to a restoring element provided at the body unit, for lifting or erecting the arm member against the weight of the manufacturing tool mounted to the arm member at the tool end. The restoring element can comprises, e.g., an elastic element and/or a chain block mechanism and/or a counter weight and/or an actuator. In such a way, the elasticity of the arm member is supported by the rope, in particular in the case of heavy manufacturing tools, in order not to be bent over a certain limit.

In particular, the arm member may comprises a plurality of arm sections connected to one another in the length direction of the arm member by hinges. These hinges may also be formed by sections with lower stiffness or smaller diameter, so that they are more flexible than the arm sections. A plurality of ropes, such as at least three ropes, are guided along the arm member from the attachment end to the tool end for movement along the arm member in its length direction, such that each rope is connected to each arm section via at least one guiding device, which might be formed as, e.g., a lug. When viewed in a cross section of the arm member perpendicular to its length direction, the ropes are spaced from one another along the circumference of the arm member, such as by equal or repeating distances. In such a way, by movement of the different ropes in a particular way the different arm sections can be moved, i.e., bent, with respect to one another, so that the direction and shape of the arm member can be adjusted, in order to adjust the position of a manufacturing tool mounted to the tool end. Some or all of the ropes can be moved by an active actuator provided at the body unit, while others of the ropes can be passively connected to an elastic element, a chain block mechanism, or a counter weight.

SUMMARY OF THE DRAWINGS

Embodiments of the present invention are described in more detail by means of accompanying drawings described as:

FIG. 1 is a front view of a first embodiment of the manufacturing assistance device according to the present invention, as worn by a technician, FIG. 2 is a side view of the embodiment shown in FIG. 1, FIG. 3 is a side view of the embodiment shown in FIG. 1, as used with a manufacturing tool during manufacture of an aircraft fuselage, FIG. 5 is a front view of a third embodiment of the manufacturing assistance device according to the invention, comprising two arm members, FIG. 10 is a detailed view of the arm member in the dotted line of FIG. 9.

DETAILED DESCRIPTION

Figure 6:
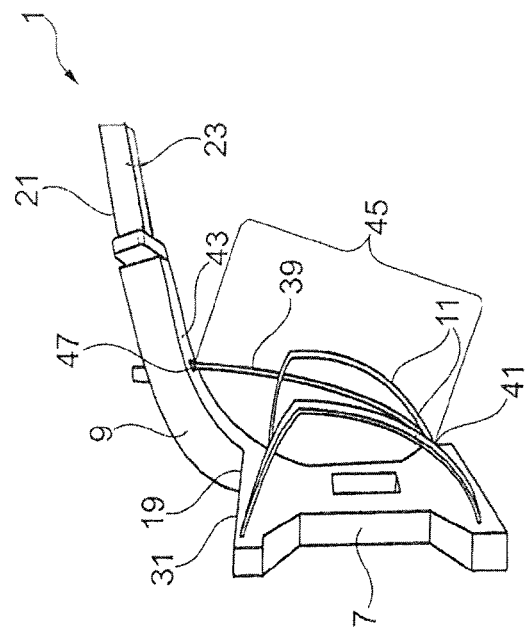
FIG. 6 is a side view of a fourth embodiment of the manufacturing assistance device according to the invention, comprising an adjustment string.

In FIGS. 1 and 2 a first embodiment of a wearable manufacturing assistance device 1 for supporting a manufacturing tool 3 during manufacture of an aircraft or spacecraft is illustrated, as worn by a technician 5.

The manufacturing assistance device 1 comprises a body unit 7 and an arm member 9. The body unit 7 includes a fastener 11 for fastening the body unit 7 to the back 13 of the technician 5 in a wearing position 15, which is shown in FIGS. 1 and 2. In the present embodiment, the body unit 7 is formed as a backpack, wherein the fastening means 11 are formed as belts configured to be passed around the shoulders 17 of a technician 5. The elongate arm member 9 has an attachment end 19 attached to the body unit 7, and a tool end 21 opposite to the attachment end 19. At the tool end 21 a mounting device 23 for mounting a manufacturing tool 3 to the arm member 9 is provided, as shown in FIG. 3. When the body unit 7 is fastened to the back 13 of a technician 5 in the wearing position 15 and the arm member 9 is in a neutral position 25 where it is in an undeformed, relaxed state, the arm member 9 extends from the attachment end 19 at the body unit 7 over the shoulder 17 and laterally past the head 27 of the technician 5, so that the tool end 21 is in the view field of the technician 5 when looking straight ahead without turning or tilting the head 27, and also within the radius of at least one of his arms 29, so that he can hold the manufacturing tool 3 which is mounted to the mounting device 23 at the tool end 21 of the arm member 9 (see FIGS. 2 and 3). As shown in FIGS. 1 and 2, the body unit 7 has a top edge 31 which points to the top when the body unit 7 is fastened to the back 13 of a technician 5 in the wearing position 15, and the arm member 9 extends beyond this top edge 31, in the present case is attached to the body unit 7 at this top edge 31.

As illustrated in FIG. 3, with the arm member 9 extending over his shoulder 17 and laterally past his head 27 when the body unit 7 is in the wearing position 15 on his back 13, the technician 5 is able to conveniently use the manufacturing assistance device 1 even in narrow spaces like the cargo compartment of an aircraft fuselage 33 where he has to work on his knees or in a bent-forward position, or when performing overhead work. The manufacturing tool 3 is steadily held in his view field in front of his head 27 or slightly above his head 27, by the arm member 9, and no parts of the manufacturing assistance device 1 proceed around or in front of his torso 35 that could handicap him or cause damage on the aircraft to be manufactured.

The arm member 9 of the embodiment shown in FIGS. 1-3 is formed in one piece of a single material, namely a Polyform PE PF663 polyethylene foam material, so that it has a homogeneous stiffness along its length. Further, the arm member 9 has a circular or square-shaped cross section including a constant diameter along its length. In such a way the arm member 9 comprises a flexibility that allows it to bend such that the tool end 21 is moveable out of the neutral position 25, where the arm member 9 is undeformed or relaxed, within a radius of one of the technician's arm of about 30 cm. The arm member 9 has a length measured from the top edge 31 of the body unit 7 to the tool end 21 of about 75 cm, a diameter of about 3 cm, and a material with a Young's modulus of below 0.1 kN/mm$^2$. The polyethylene foam material of the arm member 9 is softer than aluminum and common fiber composite materials, so that it cannot cause any damage on the aircraft or spacecraft to be manufactured. Further, the arm member 9 is removably attached to the body unit 7, so that a modular configuration of the manufacturing assistance device 1 is obtained, wherein a plurality of arm members 9 having different geometries and stiffness can be exchanged and mounted the body unit 7, depending on the actual requirements of the situation.

Figure 4:
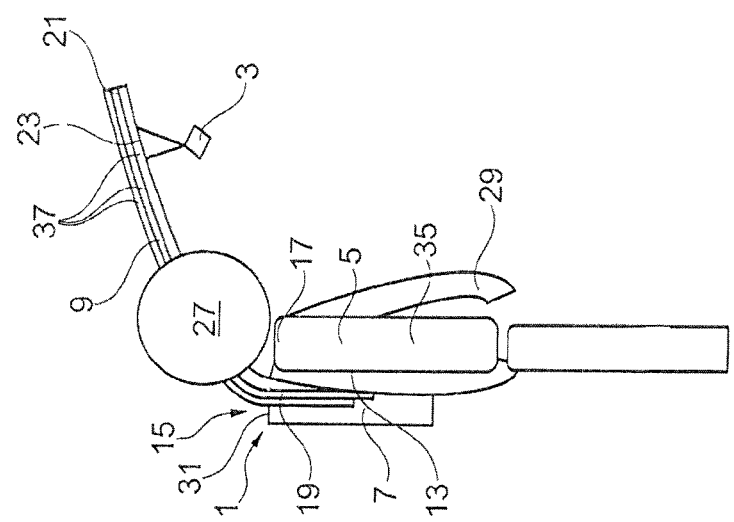
FIG. 4 is a side view of a second embodiment of the manufacturing assistance device according to the invention, wherein the arm member is formed of multiple components made up of different materials.

In FIG. 4 a second embodiment of the manufacturing assistance device 1 according to the invention is illustrated, wherein corresponding features are referred to by the same reference numerals as used in connection with the first embodiment.

The second embodiment differs from the first embodiment by the arm member 9 being formed of multiple components 37, wherein each component 37 is formed of a different material. Additionally, the different components 37 are detachably connected to one another, so that the stiffness of the arm member 9 can be adapted to different requirements by combining specific components 37 that together comprise the required stiffness.

In FIG. 5 a third embodiment of the manufacturing assistance device 1 according to the invention is illustrated, wherein corresponding features are referred to by the same reference numerals as used in connection with the previous embodiments.

The third embodiment differs from the first embodiment in that it comprises two distinct arm members 9a, 9b. In particular, the arm member 9 is defined as a first arm member 9a, its attachment end 19 is defined as a first attachment end 19a, its tool end 21 is defined as a first tool end 21a, and its mounting device 23 is defined as a first mounting device 23a. The manufacturing assistance device 1 comprises a second elongate arm member 9b similar to the first arm member 9a, which has a second attachment end 19b attached to the body unit 7 and a second tool end 21b opposite to the attachment end 19b, wherein at the second tool end 21b a second mounting device 23b for mounting a manufacturing tool 3 to the second arm member 9b is provided. When the body unit 7 is fastened to the back 13 of a technician 5 in the wearing position 15, as shown in FIG. 5, the second arm member 9b extends from the second attachment end 19b at the body unit 7 over the shoulder 17 and laterally past the head 27 of the technician 5, so that the second tool end 21b is in the view field of the technician 5 without turning or tilting his head 27, similar to the first tool end 21a. The shoulder 17 over which the second arm member 9b extends lies opposite to the shoulder 17 over which the first arm member 9a extends. By the second arm member 9b heavy manufacturing tools 3 can be additionally supported, or a second manufacturing tool 3 different from the first manufacturing tool 3 mounted to the first arm member 9a can be supported at the same time.

In FIG. 6 a fourth embodiment of the manufacturing assistance device 1 according to the invention is illustrated, wherein corresponding features are referred to by the same reference numerals as used in connection with the previous embodiments.

The fourth embodiment differs from the first embodiment mainly by an adjustment string 39 being provided which is connected to a first string connector 41 at the body unit 7 and to a second string connector 43 at the arm member 9 in such a way that it forms a triangle together with the body unit 7 and the arm member 9. The length 45 of the adjustment string 39 measured between the first string connector 41 and the second string connector 43 is adjustable, so that the angular position of the arm member 9 relative to the body unit 7 is adjustable against the restoring force of the flexible arm member 9. In the present case, the length 45 of the adjustment string 39 between the first and second string connectors 41, 43 is adjustable by a ratchet mechanism 47 provided at the second string connector 43.

Figure 8:
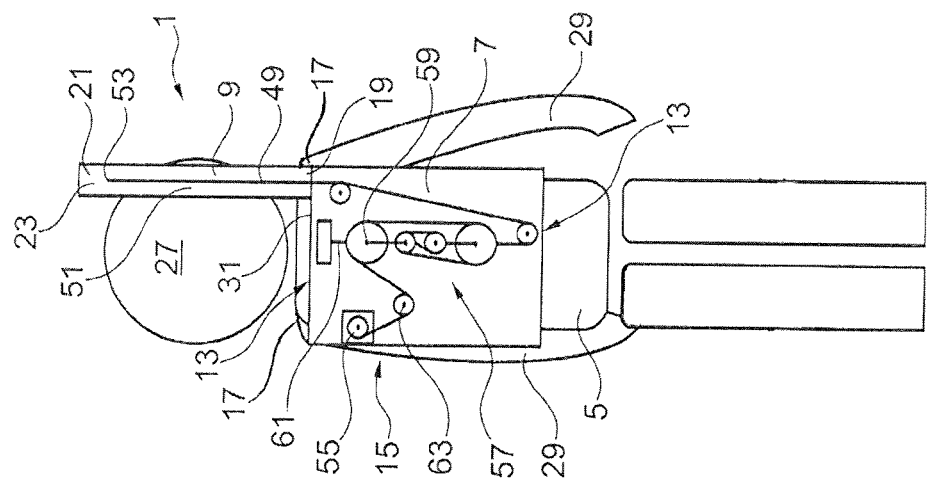
FIG. 8 is a front view of the embodiment shown in FIG. 7, FIG. 9 a front view of a sixth embodiment of the manufacturing assistance device according to the invention, wherein the arm member comprises a plurality of arm sections controlled by a plurality of ropes.
Figure 7:
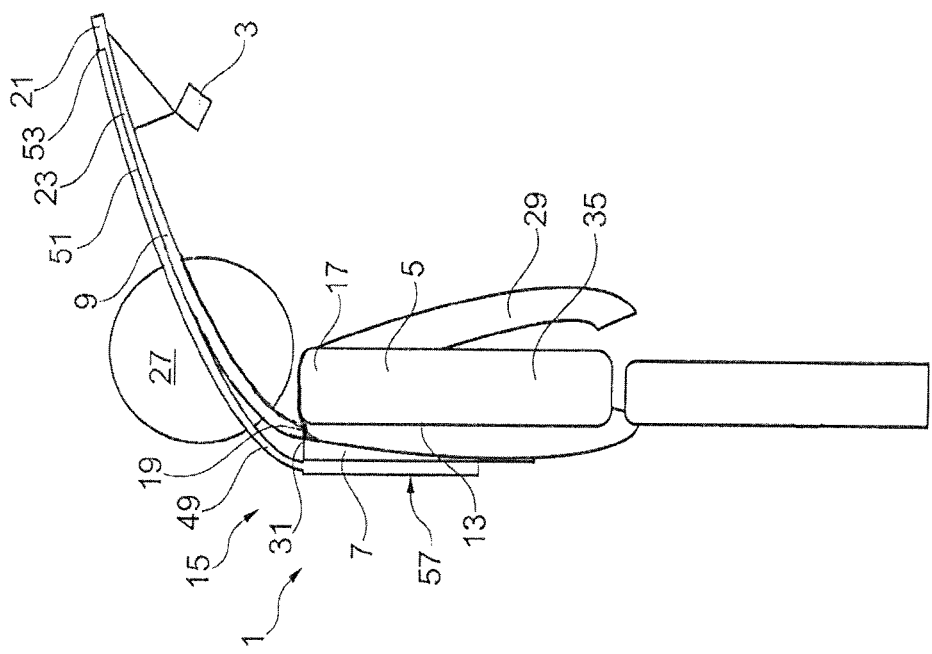
FIG. 7 is a side view of a fifth embodiment of the manufacturing assistance device according to the invention, wherein the arm member is supported by a rope.

In FIGS. 7 and 8 a fifth embodiment of the manufacturing assistance device 1 according to the invention is illustrated, wherein corresponding features are referred to by the same reference numerals as used in connection with the previous embodiments.

The fifth embodiment differs from the first embodiment by the arm member 9 being supported by a rope 49 which is guided along the upper side 51 of the arm member 9. A first end 53 of the rope 49 is connected to the arm member 9 near the tool end 21, and a second end 55 of the rope 49 is connected to a restoring element 57 provided at the body unit 7. As shown in FIG. 8, the restoring element 57 in the present embodiment is formed as a chain block mechanism 59 in combination with an elastic element 61 or a counter weight 63, so that the restoring element 57 applies a restoring force to the rope 49 which in turn causes a lifting force erecting the arm member 9 or at least supporting its stiffness.

In FIGS. 9 and 10 a sixth embodiment of the manufacturing assistance device 1 according to the invention is illustrated, wherein corresponding features are referred to by the same reference numerals as used in connection with the previous embodiments.

The sixth embodiment differs from the fifth embodiment by the arm member 9 comprising a plurality of arm sections 65 connected to one another by hinges 67. Further, a plurality of ropes 49 are guided along the arm member 9 from the attachment end 19 to the tool end 21, such that each rope 49 is connected to each arm section 65 via at least one guiding device 69, which in the present embodiment is formed as a lug. In FIG. 10 a) the arm member 9 comprising three arm sections 65 together with the guiding devices 69 guiding the ropes 49 are shown. As shown in FIG. 10 b)-d), the ropes 49 are spaced from one another along the circumference of the arm member 9 by equal or repeating distances, when viewed in a cross section 71 of the arm member 9 perpendicular to its length direction. In FIG. 10 b)-d) three different cross sections 71 are shown associated to the respective arm section 65, wherein in FIG. 10 b) three equally spaced ropes 49 are provided around the circumference of the cross section 71 of the arm section 65 with the tool end 21, in FIG. 10 c) six ropes 49 are shown in equally spaced groups of two at the arm section 65 in the middle, and in FIG. 10 d) nine ropes 49 are shown provided around the circumference of the arm section 65 with the attachment end 19 in three equally spaced groups of three.

The three arm sections 65 can be moved relative to one another by a defined movement of the respective ropes 49, which can be caused by an actuator 73. However, some of the ropes 49 can also be connected to a passive elastic element 61, chain block mechanism 59 or counter weight 63 (in FIG. 9 only one rope is visible at the body unit 7, which is controlled by an actuator 73, a chain block mechanism 59, and an elastic element 61).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wearable manufacturing assistance device configured to support a manufacturing tool, the manufacturing assistance device comprising:
   a body unit including a fastener configured to fasten the body unit to a back of a technician in a wearing position,
   an arm assembly including an attachment end attached to the body unit and a tool end opposite to the attachment end, and the arm assembly including a stack of arm members each extending from the body unit to the tool end and each of the arm members formed of foam, wherein at least one of the arm members is detachably connected to the arm assembly to allow for an adjustment in a stiffness of the arm assembly, and
   a mounting device at the tool end and configured to mount the manufacturing tool to the arm assembly,
   wherein while the body unit is fastened to the back of the technician in the wearing position, the arm assembly extends from the attachment end at the body unit over a shoulder and laterally past a head of the technician.

2. The manufacturing assistance device according to claim 1, wherein the arm assembly includes flexibility to allow the arm assembly to bend in such a way that the tool end is movable out of a neutral position where the arm assembly is not deformed, within a radius of between 10 and 50 cm.

3. The manufacturing assistance device according to claim 1, wherein the arm assembly includes a flexibility to allow the arm assembly to bend in such a way that the tool end is movable out of a neutral position where the arm assembly is not deformed, within a radius of between 20 and 40 cm.

4. The manufacturing assistance device according to claim 1, wherein the arm assembly includes a flexibility that allow the arm assembly to bend in such a way that the tool end is movable out of a neutral position where the arm assembly is not deformed, within a radius of about 30 cm.

5. The manufacturing assistance device according to claim 1, wherein the arm member is formed of a material softer than aluminum.

6. The manufacturing assistance device according to claim 1, wherein the arm members to each be formed of a material softer than a polymer resin used as matrix material of CFRP and GFRP structures.

7. The manufacturing assistance device according to claim 1, wherein the arm members are each formed of a material softer than a polyether ether ketone (PEEK) material.

8. The manufacturing assistance device according to claim 1, wherein the arm assembly has a homogeneous stiffness which is constant along the length of the arm assembly.

9. The manufacturing assistance device according to claim 1, wherein the arm assembly is formed of a single material.

10. The manufacturing assistance device according to claim 1, wherein at least one of arm members is formed of a material different than a material forming another one of the arm members.

11. The manufacturing assistance device according to claim 10, wherein at there are at least three of the arm members and at least two of the arm members are detachably connected to each other.

12. A wearable manufacturing assistance device configured to support a manufacturing tool, the manufacturing assistance device comprising:
   a body unit including a fastener configured to fasten the body unit to a back of a technician in a wearing position,
   an arm assembly including an attachment end attached to the body unit and a tool end opposite to the attachment end, wherein the arm assembly includes a stack of arm members, wherein each of the arm members is attached to the body unit and extends to the attachment end, and at least one of the arm members is detachable from the arm assembly to adjust a stiffness of the arm assembly, and
   a mounting device at the tool end and configured to mount the manufacturing tool to the arm assembly,
   wherein while the body unit is fastened to the back of the technician in the wearing position, the arm assembly extends from the attachment end at the body unit over a shoulder and laterally past a head of the technician, and
   wherein each of the arm member are formed of a material comprising at least one of a CFRP, a GFRP and wood.

13. The manufacturing assistance device according to claim 1, wherein each of the arm member are formed of polyethylene foam.

14. The manufacturing assistance device according to claim 1, wherein the arm assembly is a first arm assembly, the attachment end is a first attachment end, the tool end is a first tool end, and the mounting device is a first mounting device, wherein the manufacturing assistance device further comprises:
   a second arm assembly including a second attachment end attached to the body unit and a second tool end opposite to the second attachment end, and a second mounting device at the second attachment end and configured to mount a manufacturing tool to the second arm assembly,
   wherein, the body unit is configured to be fastened to the back of a technician in the wearing position, the second arm member extends from the second attachment end at the body unit over the shoulder and laterally past the head of the technician, and
   wherein the shoulder over which the second arm member extends is on the other side of the technician to the shoulder over which the first arm member extends.

15. The manufacturing assistance device according to claim 2, further comprising an adjustment string connected to a first string connector at the body unit and to a second string connector at the arm assembly, and wherein the length of the adjustment string measured between the first string connector and the second string connector is adjustable.

16. The manufacturing assistance device according to claim 1, wherein the body unit is formed as a backpack, and the fastener is one or more belts configured to be passed around the shoulders or the hip or the legs of a technician.

17. The manufacturing assistance device according to claim 1, wherein the arm assembly is removably attached to the body unit.

18. The manufacturing assistance device according to claim 1, wherein the arm assembly is supported by a rope which is guided along an upper side of the arm assembly, wherein a first end of the rope is connected to the arm assembly near the tool end, and a second end of the rope is connected to a restoring element provided at the body unit.

19. The manufacturing assistance device according to claim 17, wherein the arm assembly comprises a plurality of arm sections connected to one another by hinges, wherein a plurality of ropes are guided along the arm assembly from the attachment end to the tool end, such that each rope is connected to each arm section via at least one guiding device, and wherein, when viewed in a cross section of the arm assembly, the ropes are spaced from one another along the circumference of the arm assembly.

20. A wearable manufacturing assistance device comprising a backpack body unit configured to attach to the back of a technician; and a flexible arm assembly attached to and extending from the backpack body unit, wherein the flexible arm assembly has a Young's modulus no greater than 5 kN/mm$^2$, the flexible arm assembly including a stack of flexible arm members, wherein each of the flexible arm members extends from the backpack body unit to a tool end of the flexible arm assembly, and at least one of the flexible arm members is detachable from the flexible arm assembly to adjust a stiffness of the flexible arm assembly, wherein the flexible arm assembly, in a non-deformed state, extends 20 to 40 inches from an upper edge of the backpack body unit and is configured to extend from the back-pack body unit over a shoulder of the technician to forward of the front technician such that a tool end is 4 to 20 inches from the shoulder, and the flexible arm assembly has a deformed state in which the flexible arm is entirely behind the face of the technician.

21. The wearable manufacturing assistance device of claim 12, wherein at least one of the arm members is formed of a different material than is at least another one of the arm members.

22. The wearable manufacturing assistance device of claim 12, wherein the arm assembly includes at least three of the arm members.

\* \* \* \* \*